US009941783B2

(12) United States Patent
Kuo et al.

(10) Patent No.: US 9,941,783 B2
(45) Date of Patent: Apr. 10, 2018

(54) ELECTRONIC DEVICE AND SOFT START MODULE

(71) Applicant: Quanta Computer Inc., Tao Yuan Shien (TW)

(72) Inventors: Hsin-Chih Kuo, Taoyuan (TW); Ming-Chieh Lee, Taoyuan (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 19 days.

(21) Appl. No.: 15/151,600

(22) Filed: May 11, 2016

(65) Prior Publication Data
US 2017/0222544 A1    Aug. 3, 2017

(30) Foreign Application Priority Data
Jan. 28, 2016    (TW) .............................. 105102664 A

(51) Int. Cl.
*H02M 1/36* (2007.01)
*H02M 1/32* (2007.01)
*H02H 9/00* (2006.01)
*G06F 1/26* (2006.01)
*G06F 1/16* (2006.01)

(52) U.S. Cl.
CPC ............ *H02M 1/36* (2013.01); *G06F 1/1632* (2013.01); *G06F 1/26* (2013.01); *H02H 9/00* (2013.01); *H02M 1/32* (2013.01); *G06F 1/1626* (2013.01)

(58) Field of Classification Search
CPC ........ H02M 1/36; H02M 1/32; H02M 3/1584; H02M 3/33561; H02H 7/1213
USPC ................................ 363/49, 50, 65; 323/901
See application file for complete search history.

(56) References Cited

U.S. PATENT DOCUMENTS

| 4,271,460 A * | 6/1981 | Baker | H02H 7/125 |
| | | | 323/901 |
| 6,903,946 B1 * | 6/2005 | Wu | H02M 3/1584 |
| | | | 363/65 |
| 7,023,716 B1 * | 4/2006 | Wu | H02M 1/42 |
| | | | 323/222 |
| 2012/0049820 A1 * | 3/2012 | Moussaoui | H02M 1/36 |
| | | | 323/282 |

(Continued)

FOREIGN PATENT DOCUMENTS

CN    103647339 A    3/2014
TW    201447552 A    12/2014

OTHER PUBLICATIONS

Office Action issued in corresponding Taiwan patent application dated Mar. 30, 2017.

*Primary Examiner* — Adolf Berhane
(74) *Attorney, Agent, or Firm* — McClure, Qualey & Rodack, LLP

(57) ABSTRACT

An electronic device is provided. The electronic device includes a power supply module, a system load, a soft start unit, a unidirectional conducting unit and a connector. The system load is electrically coupled with the power supply module. The soft start unit is electrically coupled with the system load and the power supply module. The unidirectional conducting unit is electrically coupled between the soft start unit and the power supply module, so as to prevent the energy from the power supply module from entering the soft start unit. The connector has a power input terminal. The power input terminal is electrically coupled with the soft start unit.

15 Claims, 5 Drawing Sheets

(56) References Cited

U.S. PATENT DOCUMENTS

2015/0248150 A1* 9/2015 Kuo ..................... G06F 1/1632
713/300

* cited by examiner

ELECTRONIC DEVICE AND SOFT START MODULE

CROSS-REFERENCE TO RELATED APPLICATION

This application claims priority from Taiwan Patent Application No. 105102664, filed on Jan. 28, 2016, in the Taiwan Intellectual Property Office, the content of which are hereby incorporated by reference in their entirety for all purposes.

BACKGROUND OF THE INVENTION

1. Field of the Invention

This application relates to an electronic device, and in particular, to an electronic device disposed with a soft start module.

2. Description of the Related Art

Recently, while pursuing slim and light tablets and laptops, portability is also regarded as a critical factor to meet the market demand and the trend. As a result, the products of detachable laptops and tablets become more and more popular.

The detachable laptops and tablets may have two parts, such as the main system (i.e. the tablet terminal) and the docking station. Generally, the main system and the tablet terminal are provided with respective power supply modules, so when the main system and the tablet terminal are connected to each other, surge current may arise to damage the system under the circumstance that the electric potentials of the main system and the tablet terminal are not equal to each other.

SUMMARY OF THE INVENTION

The present disclosure provides an electronic device and a soft start module to resolve the technical problem mentioned above.

In view of the aforementioned technical problems, an embodiment of the present invention is provided. The electronic device includes a power supply module, a system load, a soft start unit, a unidirectional conducting unit and a connector. The system load is electrically coupled with the power supply module. The soft start unit is electrically coupled between the system load and the power supply module. The unidirectional conducting unit is electrically coupled between the soft start unit and the power supply module, so as to prevent the energy from the power supply module from entering the soft start unit. The connector has a power input terminal which is electrically coupled with the soft start unit.

In view of the aforementioned technical problems, another embodiment of the present invention is provided. The electronic device includes a first device body and a second device body. The first device body includes a first power supply module, a first system load, a first soft start unit and a first unidirectional conducting unit. The first system load is electrically coupled with the first power supply module. The first soft start unit is electrically coupled between the first system load and the first power supply module. The first unidirectional conducting unit is electrically coupled between the first soft start unit and the first power supply module, so as to prevent the energy from the first power supply module from entering the first soft start unit. The second device body is detachably connected to the first device body. When the second device body is connected to the first device body, a power output terminal of the second device body is electrically coupled with the first soft start unit.

In view of the aforementioned technical problems, yet another embodiment of the present invention is provided. The soft start module includes a first soft start unit and a first unidirectional conducting unit. The first soft start unit has a power input terminal and a power output terminal. The first unidirectional conducting unit is electrically coupled to the power output terminal of the first soft start unit. The first unidirectional conducting unit prevents the energy from the power output terminal of the first soft start unit from entering the first soft start unit.

In conclusion, the soft start module of the electronic device provided in the present disclosure decreases the surge current when the electronic device is receiving or delivering power, so as to prevent the system load inside the electronic device from causing erratic system behavior due to the voltage drop.

DETAILED DESCRIPTION OF THE PREFERRED EMBODIMENTS

Hereinafter, embodiments of the present disclosure will be described in detail with reference to the accompanying drawings so that those skilled in the art to which the present disclosure pertains can realize the present disclosure. As those skilled in the art would realize, the described embodiments may be modified in various different ways, all without departing from the spirit or scope of the present disclosure.

The exemplary embodiments of the present disclosure will be understood more fully from the detailed description given below and from the accompanying drawings of various embodiments of the disclosure, which, however, should not be taken to limit the disclosure to the specific embodiments, but are for explanation and understanding only.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

Figure 1:
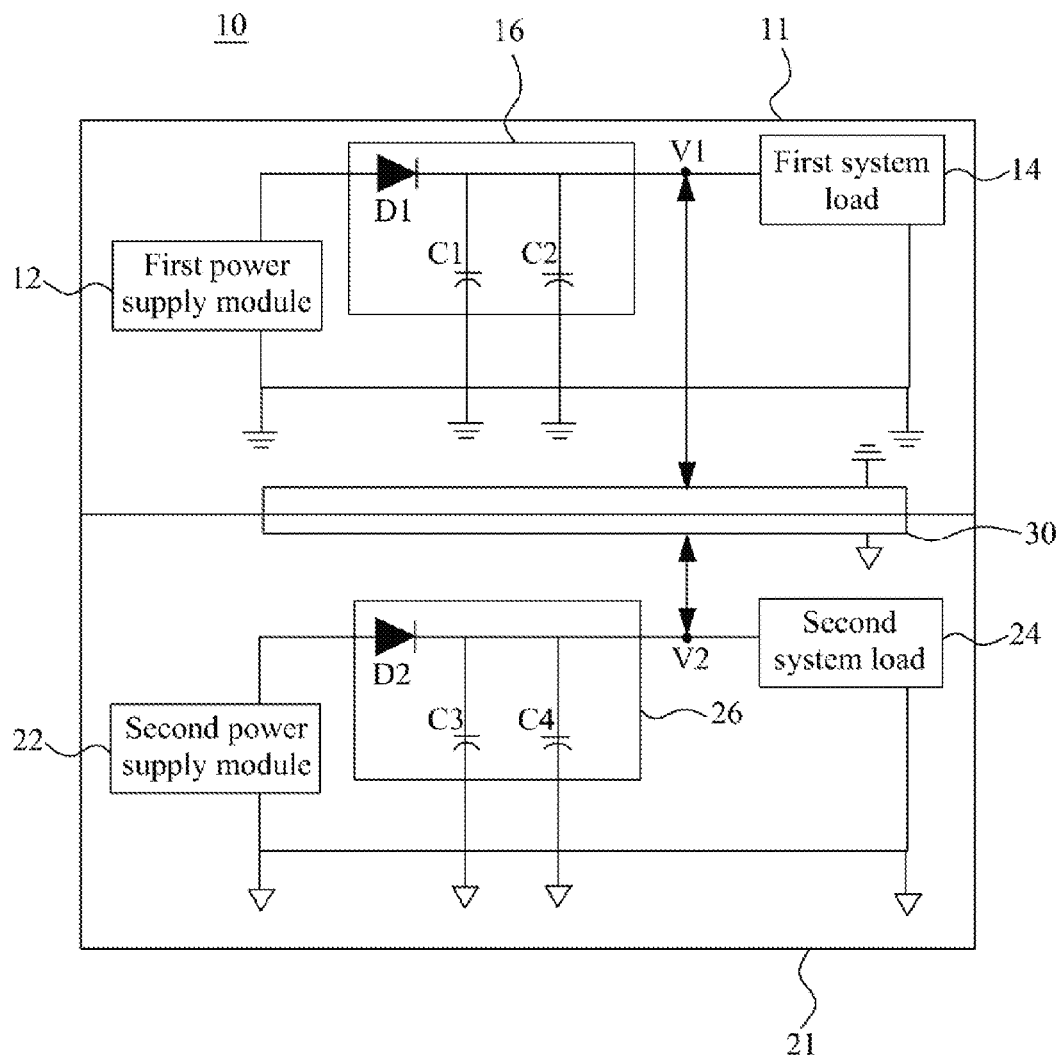
FIG. 1 is a schematic diagram of an exemplary embodiment showing the power supply circuit when the main system and the docking station of the electronic device are coupled with each other.

FIG. 1 is a schematic diagram of an exemplary embodiment showing the power supply circuit when the main system and the docking station of the electronic device are coupled with each other in accordance with the present disclosure. As shown in the figure, a main system 11 of an electronic device 10 includes a first power supply module 12, a first system load 14 and a first discharge circuit 16. A docking station 21 of the electronic device 10 includes a second power supply module 22, a second system load 24 and a second discharge circuit 26. The main system 11 and the docking station 21 of the electronic device 10 are detachably connected through a connector 30.

The first discharge circuit 16 of the main system 11 is electrically coupled between the first system load 14 and the first power supply module 12. The first discharge circuit 16 includes a first capacitor C1, a second capacitor C2 and a first diode D1. An anode of the first diode D1 is electrically coupled with the first power supply module 12, and a cathode of the first diode D1 is electrically coupled with the first system load 14. One terminal of the first capacitor C1 and one terminal of the second capacitor C2 are electrically connected to the cathode of the first diode D1, and the other terminal of the first capacitor C1 and the other terminal of the second capacitor C2 are connected to ground.

Similarly, a second discharge circuit 26 of the docking station 21 is electrically coupled between the second power supply module 22 and the second system load 24. The second discharge circuit 26 includes a third capacitor C3, a fourth capacitor C4 and a second diode D2. The connection among the electronic components in the second discharge circuit 26 is similar to that of the first discharge circuit 16. The unnecessary details are omitted herein.

As shown in the figure, when the main system 11 and the docking station 21 are coupled with each other through the connector 30, a surge current will be generated if the voltage V1 of the main system 11 does not equal to the voltage V2 of the docking station 21. For example, if the voltage V1 is higher than the voltage V2, a surge current will flow from the main system 11 to the second system load 24, the capacitor C3 and the capacitor C4 of the docking station 21 through the connector 30. Generally, the surge current increases as the voltage difference between the voltages V1 and V2 or the capacitance of the capacitors C3 and C4 increases. Similarly, the same situation happens when the voltage V2 is higher than the voltage V1. Such surge current would cause sudden voltage drop in the first system load 14 and/or the second system load 24, causing the system to behave abnormally. Besides, such surge current may trigger the overcurrent protection of the first power supply module 12 and/or the second power supply module 22, causing system blackout.

In view of this, the electronic device disposed with the soft start module provided in the present disclosure is able to avoid the surge current when electronic devices with respective power supply systems, e.g. tablets and docking station, are coupled with each other.

Figure 2:
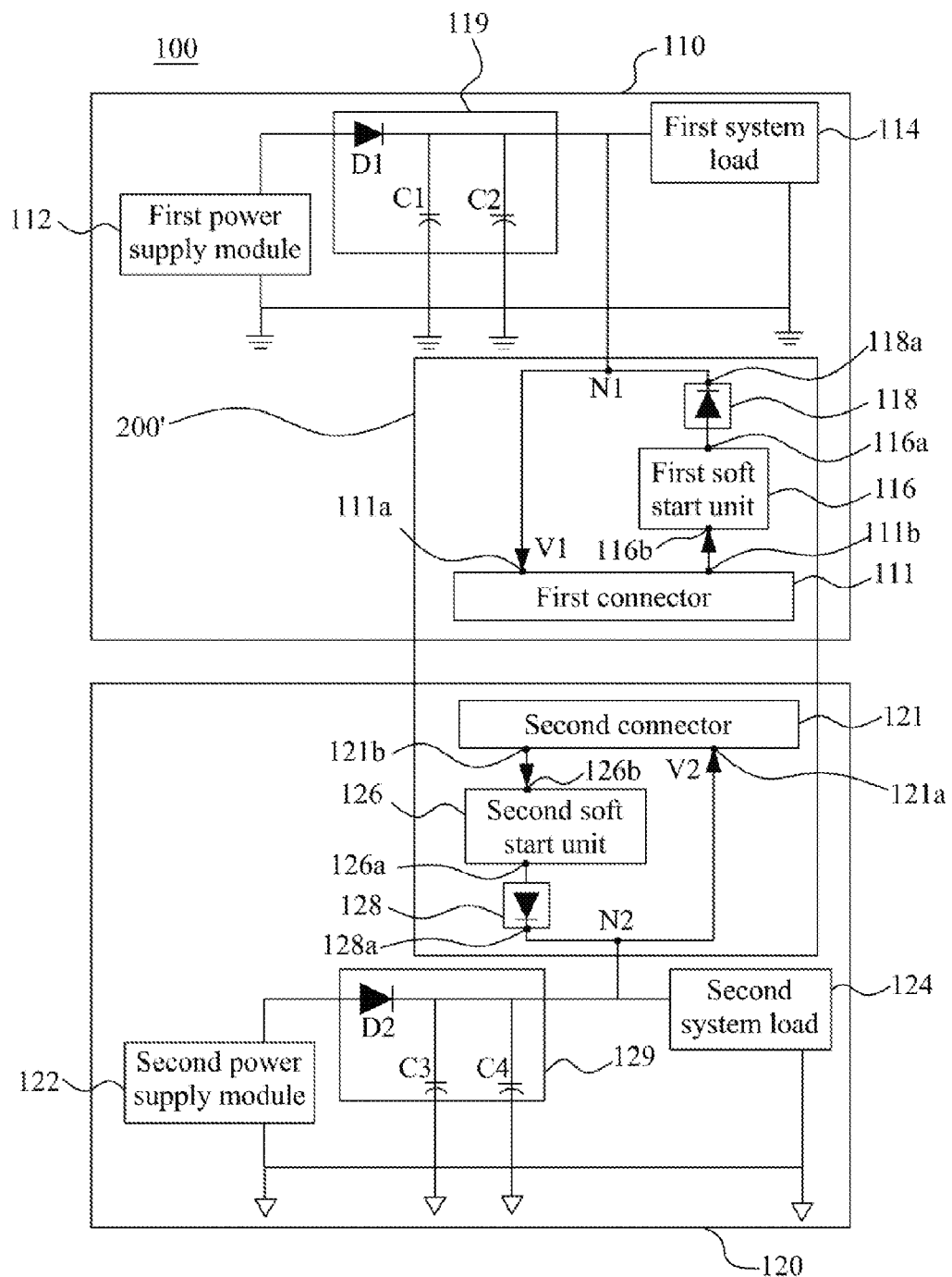
FIG. 2 is a block diagram of an electronic device in accordance with the present disclosure.

FIG. 2 is a block diagram of an electronic device in accordance with the present disclosure. As shown in the figure, the electronic device 100 includes a first device body 110 and a second device body 120, wherein the first device body 110 and the second device body 120 are detachably connected. In practice, the first device body 110 can be the main system mentioned above, such as a tablet. The second device body 120 can be the aforementioned docking station, such as a dock disposed with the keyboard, touch pad and multiple connection ports, but the present disclosure shall be not limited thereto. Any electronic devices with individual power systems and capable of connecting with each other to share power are included in the present disclosure.

Figure 3:
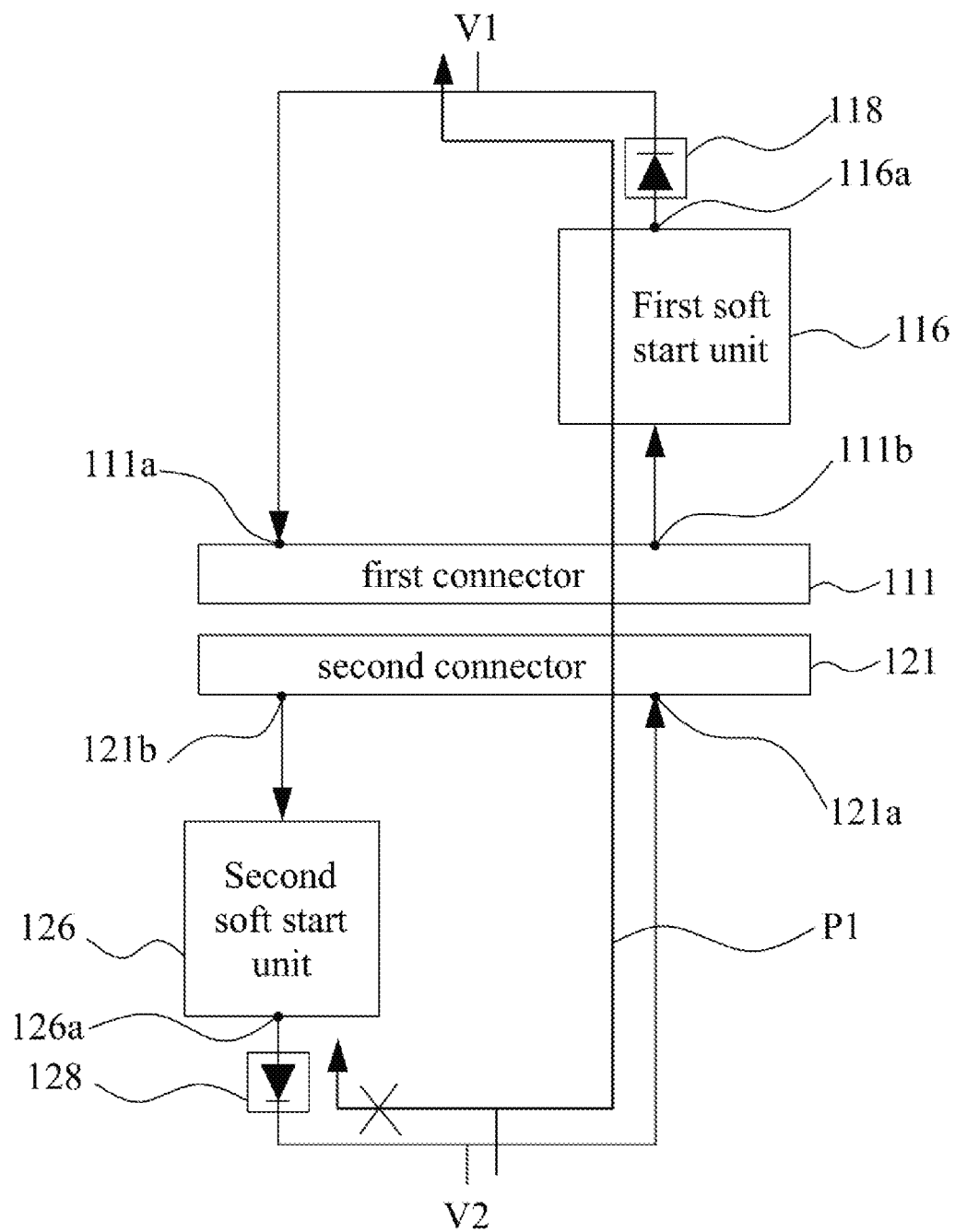
FIG. 3 is a schematic diagram showing the power supplying path when the first device body and the second device body of an electronic device are coupled with each other.

Reference herein should be made to FIG. 2 and FIG. 3 altogether. FIG. 3 is a schematic diagram showing the power supplying path when the first device body and the second device body of an electronic device are coupled with each other. As shown in the figures, the first device body 110 includes a first power supply module 112, a first system load 114, a first soft start unit 116 and a first unidirectional conducting unit 118. The first system load 114 is electrically coupled with the first power supply module 112. The first soft start unit 116 is electrically coupled between the first system load 114 and the first power supply module 112. The first unidirectional conducting unit 118 is electrically coupled between the first soft start unit 116 and the first power supply module 112, so as to prevent the energy from the first power supply module 112 from entering the first soft start unit 116.

The second device body 120 is detachably connected to the first device body 110. When the second device body 120 is connected to the first device body 110, a power output terminal 121*a* of the second device body 120 is electrically coupled with the first soft start unit 116. Since the first unidirectional conducting unit 118 prevents the energy from the first power supply module 112 from entering the first soft start unit 116, such feature can ensure that the power of the second device body 120 passes through the first soft start unit 116 when the power output terminal 121*a* of the second device body 120 is electrically coupled with the first soft start unit 116, as shown in the power supply path P1.

The first soft start unit 116 is able to prevent the voltage from sudden dramatic fluctuation. That is, if the voltage V2 of the power output terminal 121*a* of the second device body 120 is higher than the voltage V1 of a power output terminal 111*a* of the first device body 110, the voltage difference between the first and the second device bodies 110 and 120 will not be reflected immediately in the power output terminal 116*a* of the first soft start unit 116. Instead, after a buffer time, the voltage of the power output terminal 116*a* of the first soft start unit 116 increases gradually, thereby decreasing the surge current greatly. In addition, after the voltage of the power output terminal 116*a* of the first soft start unit 116 has increased, the second device body 120 starts supplying power to the first system load 114 of the first device body 110 through the first soft start unit 116.

Figure 4:
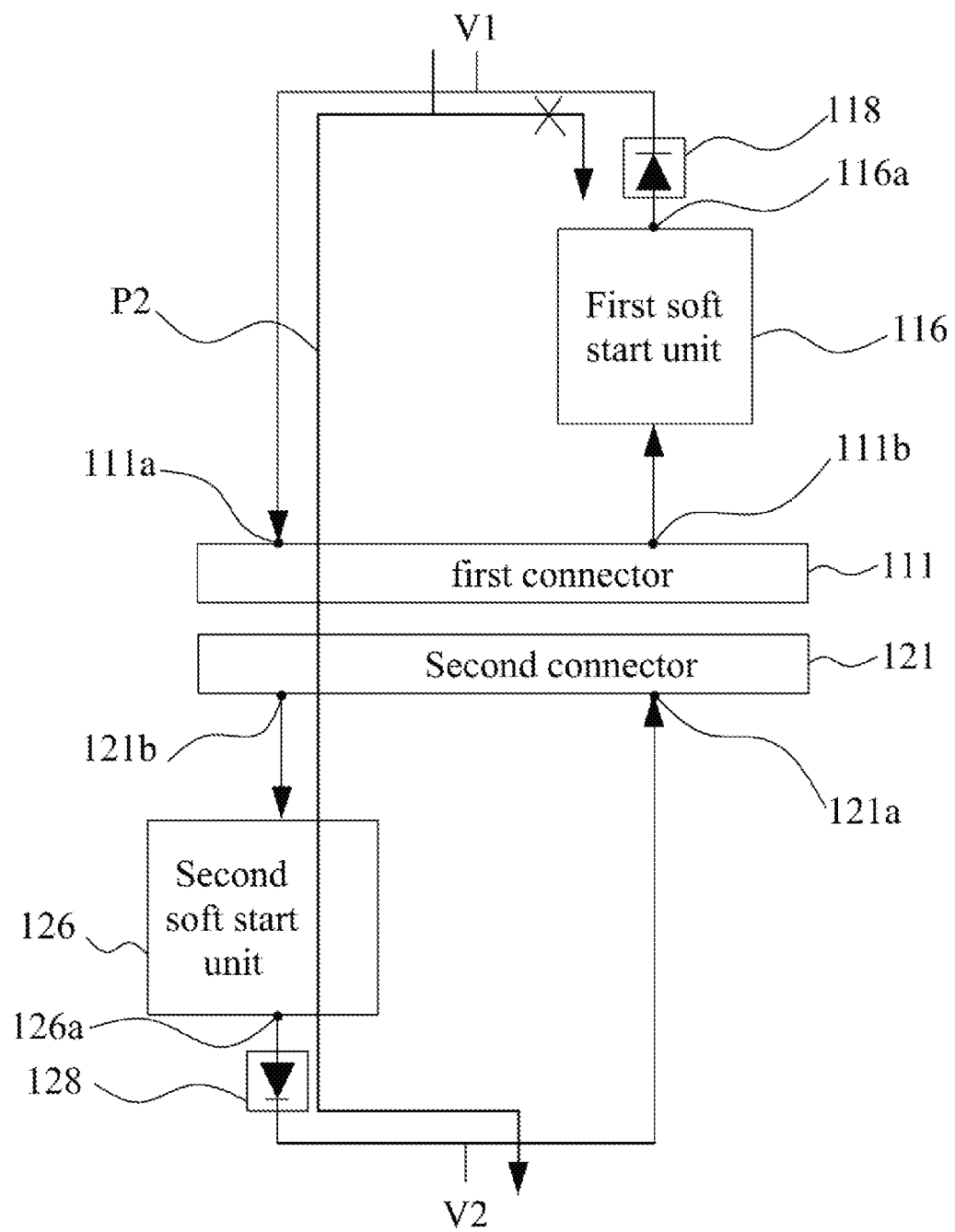
FIG. 4 is another schematic diagram showing the power supplying path when the first device body and the second device body of an electronic device are coupled with each other.

FIG. 4 is another schematic diagram showing the power supplying path when the first device body and the second device body of an electronic device are coupled with each other. Please refer to FIG. 2 and FIG. 4 together. As shown in the figures, the second device body 120 includes a second power supply module 122, a second system load 124, a second soft start unit 126 and a second unidirectional conducting unit 128. The second system load 124 is electrically coupled with the second power supply module 122. The second soft start unit 126 is electrically coupled between the second system load 124 and the second power supply module 122. The second unidirectional conducting unit 128 is electrically coupled between the second soft start unit 126 and the second power supply module 122, so as to prevent the energy from the second power supply module 122 from entering the second soft start unit 126. As mentioned above, the first device body 110 is detachably connected to the second device body 120. When the first device body 110 is connected to the second device body 120, the power output terminal 111*a* of the first device body 110 is electrically coupled with the second soft start unit 126.

Similar to the first soft start unit 116, the second soft start unit 126 is also able to prevent the voltage from sudden dramatic fluctuation. That is, if the voltage V1 of the power output terminal 111a of the first device body 110 is higher than the voltage V2 of the power output terminal 121a of the second device body 120, the voltage difference between the first and the second device bodies 110 and 120 will not be reflected immediately in the power output terminal 126a of the second soft start unit 126. Instead, after a buffer time, the voltage of the power output terminal 126a of the second soft start unit 126 increases gradually, thereby decreasing the surge current greatly. As a result, the first device body 110 supplies power to the second system load 124 of the second device body 120 through the second soft start unit 126, as shown in the power supply path P2.

Please refer to FIG. 2, FIG. 3 and FIG. 4 together. In certain embodiments, the first device body 110 further includes a first connector 111 having a power output terminal 111a and a power input terminal 111b. The second device body 120 further includes a second connector 121 having a power output terminal 121a and a power input terminal 121b. When the second device body 120 is connected to the first device body 110, the power output terminal 121a of the second connector 121 of the second device body 120 is electrically coupled with the power input terminal 111b of the first connector 111 of the first device body 110. Besides, the power input terminal 121b of the second connector 121 is electrically coupled with the power output terminal 111a of the first connector 111.

When the electronic device 100 provided by the present disclosure is receiving or delivering power, the generation of surge current and the sudden voltage drop can be avoided by means of the first soft start unit 116 and the second soft start unit 126 respectively disposed in the first device body 110 and the second device body 120. To be more precise, even though the first discharge circuit 119 and the second discharge circuit 129 respectively disposed in the first device body 110 and the second device body 120 have great capacitance, the generation of surge current can be decreased by the first soft start unit 116 and the second soft start unit 126 whether the first device body 110 charges the second device body 120 or vice versa.

It shall be understood that the electronic device 100 in the previous embodiments has two device bodies, i.e. the first device body 110 and the second device body 120, but the present disclosure is not limited thereto. In some embodiments, the electronic device may be of single device body. Any single device bodies capable of receiving energy, wherein the energy enters the system load through a soft start unit and a unidirectional conducing unit, are all included in the present disclosure.

Figure 5:
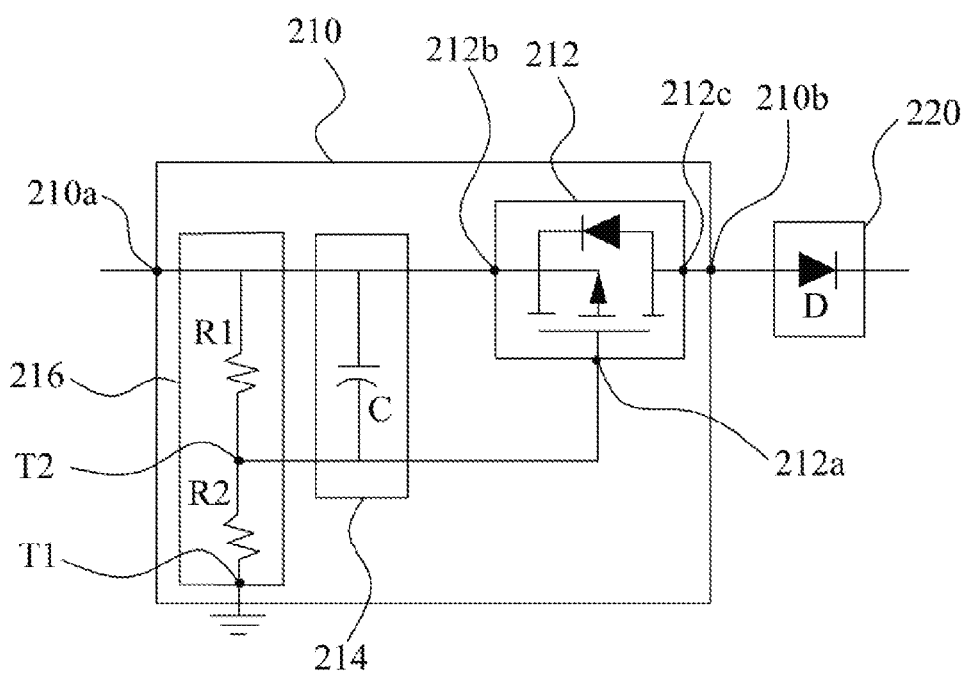
FIG. 5 is a block diagram of a circuit of a soft start module in accordance with the present disclosure.

FIG. 5 is a block diagram of a circuit of a soft start module 200 in accordance with the present disclosure. When the soft start module 200 of the present embodiment is applied to the electronic device, additional controllers such as an embedded controller are not necessary. The soft start module 200 includes a first soft start unit 210 and a first unidirectional conducting unit 220. The first soft start unit 210 has a power input terminal 210a and a power output terminal 210b. The first unidirectional conducting unit 220 is electrically coupled to the power output terminal 210b of the first soft start unit 210. The first unidirectional conducting unit 220 prevents the energy from the power output terminal 210b of the first soft start unit 210 from entering the first soft start unit 210.

When the soft start module 200 shown in FIG. 5 is applied to the electronic device shown in FIG. 1, a circuit framework similar to the first device body 110 shown in FIG. 2 can be obtained. As a result, the soft start module 200 shown in FIG. 5 can be applied to the electronic device shown in FIG. 1 without any controllers. It can therefore be found that the soft start module 200 shown in FIG. 5 is also applicable to any suitable electronic devices available nowadays so as to avoid the generation of surge current.

Please refer to FIG. 2. As shown in the figure, in certain embodiments the soft start module 200' further includes a first connector 111. The power input terminal 111b of the first connector 111 is electrically coupled with the power input terminal 116b of the first soft start unit 116, and the power output terminal 111a of the first connector 111 is electrically coupled with the power output terminal 118a of the first unidirectional conducting unit 118. The FIG. 2 shows that the power output terminal 118a of the first unidirectional conducting unit 118 and the power output terminal 111a of the first connector 111 share the same node N1. Hence, when the first connector 111 is connected to the second connector 121, whether the power is to flow from the first device body 110 into the second device body 120 or vice versa can be determined without the help of any additional controllers.

Please refer to FIG. 2 again. As shown in the figure, in certain embodiments the soft start module 200' further includes a second soft start unit 126, a second unidirectional conducting unit 128 and a second connector 121. The second soft start unit 126 includes a power output terminal 126a and a power input terminal 126b. The second unidirectional conducting unit 128 is electrically coupled with the power output terminal 126a of the second soft start unit 126. The power input terminal 121b of the second connector 121 is electrically coupled with the power input terminal 126b of the second soft start unit 126. The power output terminal 121a of the second connector 121 is electrically coupled with the power output terminal 128a of the second unidirectional conducting unit 128. Similarly, the power output terminal 128a of the second unidirectional conducting unit 128 and the power output terminal 121a of the second connector 121 share the same node N2. Thus, when second device body 120 is connected to the first device body 110, whether the energy is to flow from the first device body 110 into the second device body 120 or vice versa can be determined without the help of any extra controllers.

The soft start module 200' shown in FIG. 2 is integrated in the first and the second device bodies 110 and 120, but the present invention is not limited thereto. It shall be understood that when the first soft start unit 116 and the second soft start unit 126 are integrated in the same device body, for example being disposed in the first device body 110, it is necessary to avoid the energy from the first power supply module 112 from entering the first soft start unit 116 and the second soft start unit 126, to prevent a path from the first power supply module 112 to the first soft start unit 116 or the second soft start unit 126 from becoming conductive, resulting in the failure in buffering the voltage difference.

In practice, the first device body 110 may be a tablet which includes a display interface such as a liquid crystal display. The second device body 120 may be a docking station for the tablet which includes at least one I/O interface, for example keyboard, touch pad, and so on. The first system load 114 can be the system load of the tablet such as the processor, memory or any power-driven components of the tablet. The second system load 124 can be the system load of the docking station such as the processor, hard disk or any power-driven components of the docking station.

Please refer to FIG. 5. In practice, the first soft start unit 210 includes a switching circuit 212, a delay circuit 214 and a voltage divider 216. The switching circuit 212 is electrically coupled with the unidirectional conducting unit 220.

The delay circuit 214 is electrically coupled with the switching circuit 212. The voltage divider 216 is electrically coupled between the power input terminal 210a of the first soft start unit 210 (it can be the power input terminal electrically coupled with the connector too) and the delay circuit 214, so as to supply a divided voltage to the delay circuit 214. When the delay circuit 214 receives the divided voltage, the delay circuit 214 supplies a threshold voltage to the switching circuit 212 after a buffer time so as to prevent the switching circuit 212 from instantaneous conduction to which leads to the generation of dramatic surge current.

The switching circuit 212 includes a first terminal 212a, a second terminal 212b and a third terminal 212c. The first terminal 212a is electrically coupled with the delay circuit 214, the second terminal 212b is electrically coupled with the power input terminal 210a and the third terminal 212c is electrically coupled with the unidirectional conducting unit 220. In practice, the switching circuit 212 may include one or more PMOS or NMOS transistors, but it shall be not limited thereto.

In practice, the delay circuit 214 may include at least one capacitor C. One terminal of the capacitor C is electrically coupled with the power input terminal 210a, and the other terminal of the capacitor C is electrically coupled with the voltage divider 216. When the voltage divider 216 delivers a voltage difference to both terminals of the capacitor C, the capacitor C is charged and the voltage therein increases gradually. When the voltage in the capacitor C reaches to a threshold voltage, the switching circuit 212 starts conducting. More specifically, when the voltage of the capacitor C is approaching the threshold voltage, the conduction channel of the switching circuit 212 opens gradually. When the voltage of the capacitor C is higher than the threshold voltage, the switching circuit 212 can be regarded as being shorted. Because of the delay circuit 214, the source voltage from the power input terminal 210a will not be immediately reflected in the power output terminal 210b. Instead, after a buffer time, the voltage of the power output terminal 210b starts increasing gradually, thereby greatly decreasing the surge current.

In an embodiment, the voltage divider 216 includes a first resistor R1 and a second resistor R2. One terminal of the first resistor R1 is electrically coupled with the power input terminal 210a. The second resistor R2 has a first terminal T1 and a second terminal T2, wherein the first terminal T1 connects to ground and the second terminal T2 is electrically coupled with the first resistor R1. As shown in FIG. 5, the delay circuit 214 is electrically coupled between the first resistor R1 and the second resistor R2 so as to receive the divided voltage.

One or more embodiments disclosed above illustrate an actual aspect of the switching circuit 212, the delay circuit 214 and the voltage divider 216 in the soft start unit, but the present invention is not limited thereto. One skilled in the art can adjust the numbers, types and connections of the electronic components according to actual requirements.

Please refer to FIG. 5 again. As shown in the figure, the first unidirectional conducting unit 220 includes a diode D, but it shall be not limited thereto. In practice, any electronic circuits which can prevent the energy from entering the soft start unit are all included in the present disclosure.

In conclusion, the soft start unit of the electronic device provided by the present disclosure can decrease the surge current when the electronic device is receiving or delivering power, so as to prevent the system load in the electronic device from causing erratic system behavior due to voltage drop. In reality, take FIG. 1 for example, if the equivalent capacitance of the first, second, third and fourth capacitors are all 200 microfarad (μF) and the voltage difference between the main system 11 and the docking station 21 is 4.2 volt (V), the surge current may reach 43-44 ampere (A) and the voltage drop may be up to about 1.9 volt (V) when the main system 11 is connected to the docking station 21.

For the same set of parameters, if the soft start module 200 shown in FIG. 5 is applied to the electronic device shown in FIG. 1 (similar to the aspect shown in FIG. 2) and the first resistance is 10 kΩ, the second resistance is 100 kΩ and the capacitance of the capacitor C is 1 μF, the surge current may be decreased to 2.16-2.34 A and the voltage drop may be reduced to 400 mv. To be more precise, if the capacitance of the capacitor C is 4.7 μF, the surge current may be decreased to 810 mA and the voltage may drop to 260 mv.

While the means of specific embodiments in present disclosure has been described by reference drawings, numerous modifications and variations could be made thereto by those skilled in the art without departing from the scope and spirit of the disclosure set forth in the claims. The modifications and variations should in a range limited by the specification of the present disclosure.

What is claimed is:

1. An electronic device, comprising:
   a power supply module;
   a system load electrically coupled with the power supply module;
   a soft start unit electrically coupled between the system load and the power supply module;
   a unidirectional conducting unit electrically coupled between the soft start unit and the power supply module, so as to prevent energy from the power supply module from entering the soft start unit; and
   a connector having a power input terminal and a power output terminal, wherein the power input terminal is electrically coupled with the soft start unit and the power output terminal is electrically coupled with the unidirectional conducting unit, wherein the soft start unit comprises:
   a switching circuit electrically coupled with the unidirectional conducting unit;
   a delay circuit electrically coupled with the switching circuit; and
   a voltage divider electrically coupled between the power input terminal and the delay circuit, so as to supply a divided voltage to the delay circuit;
   wherein when the delay circuit receives the divided voltage, the delay circuit supplies a threshold voltage to the switching circuit after a buffer time.

2. The electronic device of claim 1, wherein the switching circuit comprises a first terminal, a second terminal and a third terminal; the first terminal is electrically coupled with the delay circuit, the second terminal is electrically coupled with the power input terminal and the third terminal is electrically coupled with the unidirectional conducting unit.

3. The electronic device of claim 1, wherein the delay circuit comprises a capacitor, one terminal of the capacitor is electrically coupled with the power input terminal and the other terminal of the capacitor is electrically coupled with the voltage divider.

4. The electronic device of claim 1, wherein the voltage divider comprises:
   a first resistor with one terminal thereof electrically coupled with the power input terminal, and a second resistor having a first terminal and a second terminal, wherein the first terminal is grounded and the second terminal is electrically coupled with the first resistor;

wherein the delay circuit is electrically coupled between the first resistor and the second resistor so as to receive the divided voltage.

5. The electronic device of claim 1, wherein the unidirectional conducting unit is a diode.

6. An electronic device, comprising:
a first device body, comprising:
a first power supply module;
a first system load electrically coupled with the first power supply module;
a first soft start unit electrically coupled between the first system load and the first power supply module; and
a first unidirectional conducting unit electrically coupled between the first soft start unit and the first power supply module, so as to prevent energy from the first power supply module from entering the first soft start unit;
a second device body detachably connected to the first device body; and
a first connector having a power input terminal and a power output terminal;
wherein, the power input terminal of the first connector is electrically coupled with the first soft start unit, and when the second device body is connected to the first device body, a power output terminal of the second device body is electrically coupled with the power input terminal of the first connector.

7. The electronic device of claim 6, wherein the second device body further comprises:
a second power supply module;
a second system load electrically coupled with the second power supply module;
a second soft start unit electrically coupled between the second system load and the second power supply module; and
a second unidirectional conducting unit electrically coupled between the second soft start unit and the second power supply module, so as to prevent energy from the second power supply module from entering the second soft start unit;
wherein, when the second device body is connected to the first device body, a power output terminal of the first device body is electrically coupled with the second soft start unit.

8. The electronic device of claim 7, wherein the second device body further comprises:
a second connector, wherein the power output terminal of the second device body is disposed on the second connector.

9. The electronic device of claim 7, wherein when the first device body is connected to the second device body, the first power supply module of the first device body supplies power to the second system load through the second soft start unit if a voltage of the power output terminal of the first device body is higher than a voltage of the power output terminal of the second device body.

10. The electronic device of claim 7, wherein when the first device body is connected to the second device body, the second power supply module of the second device body supplies power to the first system load through the first soft start unit if the voltage of the power output terminal of the first device body is lower than the voltage of the power output terminal of the second device body.

11. The electronic device of claim 6, wherein the first device body comprises a display interface.

12. The electronic device of claim 6, wherein the second device body comprises at least one input interface.

13. A soft start module, comprising:
a first soft start unit having a power input terminal and a power output terminal;
a first unidirectional conducting unit electrically coupled to the power output terminal of the first soft start unit; and
a first connector having a power output terminal and a power input terminal;
wherein the first unidirectional conducting unit prevents energy from the power output terminal of the first soft start unit from entering the first soft start unit;
wherein the power input terminal of the first connector is electrically coupled with the power input terminal of the first soft start unit, and the power output terminal of the first connector is electrically coupled with the power output terminal of the first unidirectional conducting unit,
a second soft start unit having a power input terminal and a power output terminal; and
a second unidirectional conducting unit electrically coupled to the power output terminal of the second soft start unit;
wherein the second unidirectional conducting unit prevents energy from the power output terminal of the second soft start unit from entering the second soft start unit.

14. The soft start module of claim 13, further comprising a second connector having a power output terminal and a power input terminal;
wherein, the power input terminal of the second connector is electrically coupled with the power input terminal of the second soft start unit, and the power output terminal of the second connector is electrically coupled with the power output terminal of the second unidirectional conducting unit.

15. The soft start module of claim 13, wherein the first unidirectional conducting unit and the second unidirectional conducting unit respectively comprise a diode.

* * * * *